United States Patent
Venkataraghavan

(10) Patent No.: US 12,513,665 B2
(45) Date of Patent: Dec. 30, 2025

(54) SYSTEM, METHOD, AND COMPUTER PROGRAM FOR MANAGING UPLINK PATH

(71) Applicant: RAKUTEN MOBILE, INC., Tokyo (JP)

(72) Inventor: Krishnan Venkataraghavan, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 423 days.

(21) Appl. No.: 18/013,329

(22) PCT Filed: Nov. 28, 2022

(86) PCT No.: PCT/US2022/051056
§ 371 (c)(1),
(2) Date: Dec. 28, 2022

(87) PCT Pub. No.: WO2024/118042
PCT Pub. Date: Jun. 6, 2024

(65) Prior Publication Data
US 2024/0298299 A1    Sep. 5, 2024

(51) Int. Cl.
*H04W 72/04* (2023.01)

(52) U.S. Cl.
CPC ................... *H04W 72/04* (2013.01)

(58) Field of Classification Search
CPC . H04W 72/04; H04W 28/0236; H04W 40/12; H04L 45/24; H04L 67/10; H04L 69/28; H04L 69/14
See application file for complete search history.

(56) References Cited

U.S. PATENT DOCUMENTS

| | | | |
|---|---|---|---|
| 2014/0355566 A1* | 12/2014 | Walley | H04W 36/008375 370/331 |
| 2016/0006837 A1 | 1/2016 | Reynolds et al. | |
| 2022/0361086 A1* | 11/2022 | Wang | H04W 40/12 |
| 2023/0070855 A1* | 3/2023 | Zhou | H04B 17/336 |
| 2023/0076738 A1* | 3/2023 | Dhanapal | H04W 36/36 |
| 2023/0353482 A1* | 11/2023 | Means | H04L 45/123 |

FOREIGN PATENT DOCUMENTS

| | | | | |
|---|---|---|---|---|
| EP | 3606171 A1 * | 2/2020 | | H04W 28/22 |
| EP | 4044526 A1 * | 8/2022 | | H04L 43/0829 |
| WO | WO-2022010398 A1 * | 1/2022 | | H04L 5/0064 |

OTHER PUBLICATIONS

Written opinion dated Mar. 28, 2023 issued in Application No. PCT/US 22/51056.
International Search Report dated Mar. 28, 2023 issued in Application No. PCT/US 22/51056.

* cited by examiner

*Primary Examiner* — Cheikh T Ndiaye
(74) *Attorney, Agent, or Firm* — Sughrue Mion, PLLC

(57) ABSTRACT

Provided are system, method, and device for managing uplink path. The system including: a network node including: a memory storing instructions; and at least one processor configured to execute the instructions to: determine one or more optimal uplink (UL) data paths for a user equipment (UE); and provide information associated with the optimal UL path to the UE.

16 Claims, 11 Drawing Sheets

| LTE UL Path Quality | NR UL Path Quality | Cell Group ID | UL Data Split Threshold |
|---|---|---|---|
| 0 | 0 | Preconfigured Primary UL Path (Cell Group 0) | Predetermined Threshold |
| 0 | 1 | NR | Infinity |
| 1 | 0 | LTE | Infinity |
| 1 | 1 | LTE + NR | Predetermined Threshold |

FIG. 9

SYSTEM, METHOD, AND COMPUTER PROGRAM FOR MANAGING UPLINK PATH

This Application is a National Stage of International Application No. PCT/US2022/051056 filed Nov. 28, 2022.

1. FIELD

Systems and methods consistent with example embodiments of the present disclosure relate to telecommunication technologies and, more particularly, relate to systems and methods for managing uplink path for a user equipment in a telecommunication system.

2. DESCRIPTION OF RELATED ART

Related art telecommunication technologies may allow a user equipment (UE) to access multiple network systems each of which has a different technology. For instance, in 5th generation (5G) non-standalone (NSA) deployment, a UE may access both of a 4th generation (4G) Long-Term Evolution (LTE) network system and a 5G new radio (NR) network system. Further, in NSA deployment, two cell groups are utilized: a master cell group (MCG) and a secondary cell group (SCG). MCG comprises cells formed by one or more 4G LTE base stations (eNodeB), while SCG comprises cells formed by one or more 5G NR base stations (gNodeB).

Generally, a UE may perform initial registration and connection to an eNodeB of a MCG, and the eNodeB may enable the UE to connect to a gNodeB of a SCG when applicable. For instance, the UE may first be attached to the eNodeB of the MCG followed by default bearer configuration on LTE. Once the signaling radio bearer (SRB) and data radio bearer (DRB) are established between the UE and the eNodeB, the eNodeB may transmit a reconfiguration message (e.g., RRC Connection Reconfiguration message) containing information for adding a gNodeB of a SCG (e.g., NR measurements, B1 threshold, etc.) to the UE. Subsequently, the UE may detect if there is any available gNodeB in the SCG which fulfill the requirement for addition.

By way of example, the UE may measure a reference signal received power (RSRP) of the gNodeB of SCG and determine whether or not the RSRP satisfies the B1 threshold (e.g., RSRP greater than or equal to B1 threshold, etc.). Upon determining that there is an available gNodeB in the SCG which fulfill the requirement, the gNodeB may be added, at which the UE is said to be in a dual connectivity state (e.g., E-UTRAN New Radio Dual Connectivity (ENDC) state, etc.). At this stage, the UE may utilize both eNodeB of MCG and gNode of SCG in data transmission. Among others, the UE may establish an uplink (UL) path with the eNodeB of MCG and establish an UL path with the gNodeB of SCG, in order to transmit UL data to the eNodeB and gNodeB respectively.

In this regards, the reconfiguration message transmitted from the eNodeB to the UE may comprise information associated with UL path configuration. For instance, an RRC Connection Reconfiguration message may comprise packet data convergence protocol (PDCP) configuration information, which include at least two essential parameters for configuring an UL path, namely: (1) primaryPath, and (2) ul-DataSplitThreshold.

Parameter (1) may be utilized by the UE to select a primary UL path. For instance, parameter (1) may comprise a Cell Group ID, wherein "Cell Group ID: 0" indicates that the UL path between the UE and the eNodeB of the MCG should be utilized as primary UL path (i.e., the UL path between the UE and the gNodeB of the SCG should be utilized as secondary UL path), while "Cell Group ID: 1" indicates that the UL path between the UE and the gNodeB of the SCG should be utilized as primary UL path (i.e., the UL path between the UE and the eNodeB of the MCG should be utilized as secondary UL path).

Parameter (2) may be utilized by the UE to determine when to utilize the secondary UL path to transmit UL data. For instance, the UE would first attempt to transmit the UL data via the primary UL path based on parameter (2), and once the UL data reach the threshold defined in parameter (2), the UE will utilize the secondary UL path to transmit all data exceeding said threshold. By way of example, assuming that the primary UL path is configured as gNodeB (SCG), and parameter (2) is configured to have a threshold of 160 bytes. In this case, the UE will utilize the UL path with the gNodeB of SCG to transmit UL data up to 160 bytes, and all data exceeding 160 bytes will be tunneled on the UL path with the eNodeB of MCG.

In the related art, the configuration of UL path is preset and is static (since parameters (1) and (2) are preset and static). Nevertheless, as discussed in detail below, there are several drawbacks in the UL path configuration in the related art.

Specifically, all UEs have a maximum transmit power which define the transmission capability of the UE. In this regard, in NSA deployment, a maximum UL transmit power of a UE may be shared between the eNodeB (MCG) and gNodeB (SCG) leg in UL. For instance, a UE may have a maximum UL transmit power of 23 dbm (under power class 3) for utilizing both the eNodeB and gNodeB for UL data transmission under NSA deployment. Further, different technology may consume different amounts of transmit power. For instance, a gNodeB may consume higher amount of transmit power as compared to eNodeB, since 5G NR utilizes higher bandwidth as compared to 4G LTE. Namely, the UE would need to consume more transmit power in order to transmit UL data when the UL path between the gNodeB and the UE is utilized as the primary UL path.

In view of the above, the configuration and selection of the primary UL path are important aspects to ensure power efficient connectivity and optimize the power consumption of the UE. As discussed above, in the related art, the configuration and selection of the primary UL path are based on preset and static parameters. Nevertheless, in view of the dynamic nature of the network conditions, it is difficult to provide a reliable UL communication which has consistent and optimal performance in the related art.

By way of example, a UL path between a UE and a gNodeB (SCG) may be selected as primary UL path in view of the higher UL throughput. In that case, at the initial stage when the UE has a good connection with gNodeB, utilizing the UL path between the gNodeB and the UE may be optimal. Nevertheless, whenever the UE has a poor connection with the gNodeB (e.g., UE is at the cell edge of the SCG, UE is in a building in which the gNodeB signaling is weak, etc.), using the UL path between the UE and the gNodeB as the primary UL path may no longer be optimal and may instead negatively impact the UE performances. Similar drawbacks are applicable when the UL path between the eNodeB and the UE is utilized as primary UL path.

To this end, the UE may increase the transmit power so as to compensate the power loss during the poor UL communication via the primary UL path, which may in turn reduce the transmit power available to be utilized by the secondary UL path and may thereby reduce the performance of the UE when transmitting UL data via the secondary UL data.

Further, poor UL performance may also affect the downlink (DL) performance of the UE. For instance, the UL performance may degrade due to the limited UL transmit power availability, which may in turn result in high block error rate (BLER), poor UL throughput, and/or limited power headroom report (PHR) transmission, that may eventually degrade the DL performance. Accordingly, the suboptimal primary UL path utilization may cause transmit power wastage, poor UL and DL performance, and ultimately result in poor user's experience.

SUMMARY

According to embodiments, systems methods, and devices are provided for automatically and dynamically determining an optimal uplink (UL) data path for a user equipment (UE). Specifically, the system and method of the present disclosures may dynamically determine one or more UL performance of a UE in real-time or near real-time, and may then determine an UL path that is most optimal to the real-time or near real-time condition. Accordingly, example embodiments of the present disclosures enable power efficient connectivity among UE and base stations under NSA deployment, reduce UE's transmit power wastage, improve UE's transmit power utilization among base stations, improve UL performance, and avoid poor user's experience.

According to embodiments, a system includes: a network node including: a memory storing instructions; and at least one processor configured to execute the instructions to: determine one or more optimal uplink (UL) data paths for a user equipment (UE); and provide information associated with the optimal UL path to the UE.

The at least one processor may be configured to execute the instruction to determine the one or more optimal UL data paths by: determining a Long Term Evolution (LTE) UL path quality; determining a New Radio (NR) UL path quality; and selecting the one or more optimal UL data paths based on the determined LTE UL path quality and the determined NR UL path quality.

The at least one processor may be configured to execute the instruction to determine the LTE UL path quality by: obtaining a first value defining the LTE UL path quality and a first threshold value; comparing the first value to the first threshold value; based on determining that the first value is equal to or greater than the first threshold value, determining that LTE UL path quality is good; and based on determining that the first value is lower than the first threshold value, determining that the LTE UL path quality is poor.

The at least one processor may be configured to execute the instruction to determine the NR UL path quality by: obtaining a second value defining the NR UL path quality and a second threshold value; comparing the second value to the second threshold value; based on determining that the second value is equal to or greater than the second threshold value, determine that NR UL path quality is good; and based on determining that the second value is lower than the second threshold value, determine that the NR UL path quality is poor.

The at least one processor may be configured to execute the instruction to obtain the first value by: determining whether or not at least one parameter associated with the LTE UL performance fulfills a condition defined by a threshold associated with the at least one parameter; determining whether or not a timer value fulfills a condition defined by a timer threshold; based on determining that the at least one parameter does not fulfill the condition defined by the threshold and based on determining that the timer value fulfills the condition defined by the timer threshold, assign to the first value a value defining that the LTE UL path quality is good; and based on determining that the at least one parameter fulfills the condition defined by the threshold and based on determining that the timer value fulfills the condition defined by the timer threshold, assign to the first value a value defining that the LTE UL path quality is poor.

The at least one processor may be configured to execute the instruction to obtain the second value by: determining whether or not at least one parameter associated with the NR UL performance fulfills a condition defined by a threshold associated with the at least one parameter; determining whether or not a timer value fulfills a condition defined by a timer threshold; based on determining that the at least one parameter does not fulfills the condition defined by the threshold and based on determining that the timer value fulfills the condition defined by the timer threshold, assign to the second value a value defining that the NR UL path quality is good; and based on determining that the at least one parameter fulfills the condition defined by the threshold and based on determining that the timer value fulfills the condition defined by the timer threshold, assign to the second value a value defining that the NR UL path quality is poor.

The at least one processor may be configured to execute the instruction to select the one or more optimal UL data paths by: determining a combination of the LTE UL path quality and the NR UL path quality; based on determining that the combination defines that the LTE UL path quality is poor and the NR UL path quality is poor, selecting one or more default primary UL path as the one or more optimal UL paths; based on determining that the combination defines that the LTE UL path quality is poor and the NR UL path quality is good, selecting the NR UL path as the one or more optimal UL paths; based on determining that the combination defines that the LTE UL path quality is good and the NR UL path quality is poor, selecting the LTE UL path as the one or more optimal UL paths; and based on determining that the combination defines that the LTE UL path quality is good and the NR UL path quality is good, selecting the LTE UL path quality and the NR UL path as the one or more optimal UL paths.

The at least one processor may be further configured to execute the instruction to: based on determining that only one of the LTE UL path and the NR UL path is selected as the one or more optimal UL paths, configure a value defining a UL data split threshold to infinity According to embodiments, a method, performed by at least one processor, includes: determining one or more optimal uplink (UL) data paths for a user equipment (UE); and providing information associated with the optimal UL path to the UE.

The determining of the one or more optimal UL data paths may include: determining a Long Term Evolution (LTE) UL path quality; determining a New Radio (NR) UL path quality; and selecting the one or more optimal UL data paths based on the determined LTE UL path quality and the determined NR UL path quality.

The determining of the LTE UL path quality may include: obtaining a first value defining the LTE UL path quality and a first threshold value; comparing the first value to the first threshold value; based on determining that the first value is equal to or greater than the first threshold value, determining that LTE UL path quality is good; and based on determining that the first value is lower than the first threshold value, determining that the LTE UL path quality is poor.

The determining of the NR UL path quality may include: obtaining a second value defining the NR UL path quality and a second threshold value; comparing the second value to the second threshold value; based on determining that the second value is equal to or greater than the second threshold value, determine that NR UL path quality is good; and based on determining that the second value is lower than the second threshold value, determine that the NR UL path quality is poor.

The obtaining of the first value may include: determining whether or not at least one parameter associated with the LTE UL performance fulfills a condition defined by a threshold associated with the at least one parameter; determining whether or not a timer value fulfills a condition defined by a timer threshold; based on determining that the at least one parameter does not fulfill the condition defined by the threshold and based on determining that the timer value fulfills the condition defined by the timer threshold, assign to the first value a value defining that the LTE UL path quality is good; and based on determining that the at least one parameter fulfills the condition defined by the threshold and based on determining that the timer value fulfills the condition defined by the timer threshold, assign to the first value a value defining that the LTE UL path quality is poor.

The obtaining of the second value may include: determining whether or not at least one parameter associated with the NR UL performance fulfills a condition defined by a threshold associated with the at least one parameter; determining whether or not a timer value fulfills a condition defined by a timer threshold; based on determining that the at least one parameter does not fulfills the condition defined by the threshold and based on determining that the timer value fulfills the condition defined by the timer threshold, assign to the second value a value defining that the NR UL path quality is good; and based on determining that the at least one parameter fulfills the condition defined by the threshold and based on determining that the timer value fulfills the condition defined by the timer threshold, assign to the second value a value defining that the NR UL path quality is poor.

The selecting of the one or more optimal UL data paths may include: determining a combination of the LTE UL path quality and the NR UL path quality; based on determining that the combination defines that the LTE UL path quality is poor and the NR UL path quality is poor, selecting one or more default primary UL path as the one or more optimal UL paths; based on determining that the combination defines that the LTE UL path quality is poor and the NR UL path quality is good, selecting the NR UL path as the one or more optimal UL paths; based on determining that the combination defines that the LTE UL path quality is good and the NR UL path quality is poor, selecting the LTE UL path as the one or more optimal UL paths; and based on determining that the combination defines that the LTE UL path quality is good and the NR UL path quality is good, selecting the LTE UL path quality and the NR UL path as the one or more optimal UL paths.

Furthermore, the method may further include: based on determining that only one of the LTE UL path and the NR UL path is selected as the one or more optimal UL paths, configuring a value defining a UL data split threshold to infinity.

According to embodiments, a non-transitory computer-readable recording medium having recorded thereon instructions executable by at least one processor to cause the at least one processor to perform a method including: determining one or more optimal uplink (UL) data paths for a user equipment (UE); and providing information associated with the optimal UL path to the UE.

The non-transitory computer-readable recording medium may have recorded thereon instructions executable by at least one processor to cause the at least one processor to perform the method, in which the determining of the one or more optimal UL data paths may include: determining a Long Term Evolution (LTE) UL path quality; determining a New Radio (NR) UL path quality; and selecting the one or more optimal UL data paths based on the determined LTE UL path quality and the determined NR UL path quality.

The non-transitory computer-readable recording medium may have recorded thereon instructions executable by at least one processor to cause the at least one processor to perform the method, in which the determining of the LTE UL path quality may include: obtaining a first value defining the LTE UL path quality and a first threshold value; comparing the first value to the first threshold value; based on determining that the first value is equal to or greater than the first threshold value, determining that LTE UL path quality is good; and based on determining that the first value is lower than the first threshold value, determining that the LTE UL path quality is poor.

The non-transitory computer-readable recording medium may have recorded thereon instructions executable by at least one processor to cause the at least one processor to perform the method, in which the determining of the NR UL path quality may include: obtaining a second value defining the NR UL path quality and a second threshold value; comparing the second value to the second threshold value; based on determining that the second value is equal to or greater than the second threshold value, determine that NR UL path quality is good; and based on determining that the second value is lower than the second threshold value, determine that the NR UL path quality is poor.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 9 illustrates a table containing example configurations of UL parameters, according to one or more embodiments;

DETAILED DESCRIPTION

Figure 1:
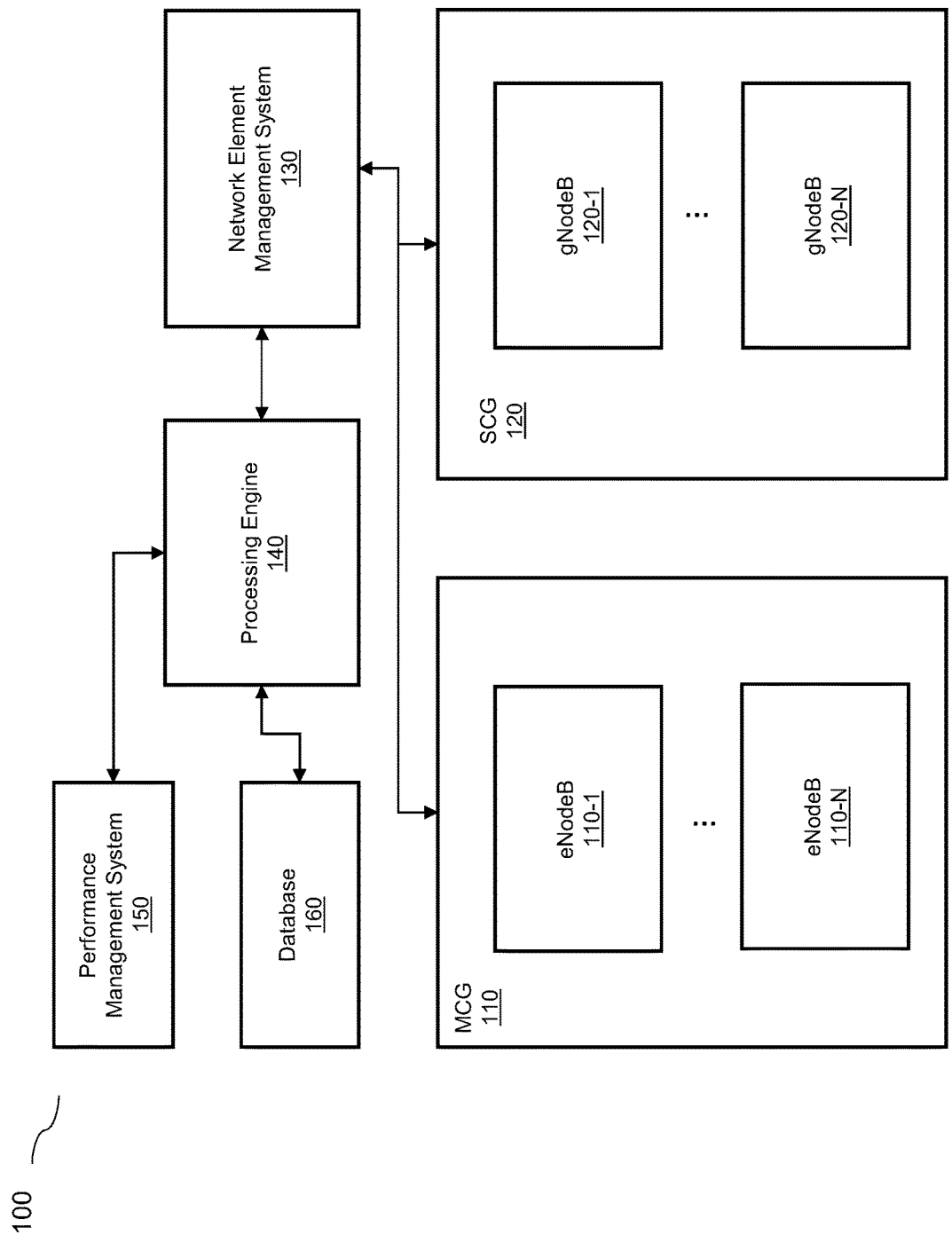
FIG. 1 illustrates an example block diagram of a system for managing one or more uplink (UL) paths for one or more user equipment (UE), according to one or more embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

In addition, the terms "node", "network node", and "network element", as used herein, may refer to one or more hardware components constituting a base station; a software which, when being executed, performs one or more operations of a base station; or a combination of hardware and software, unless explicitly stated otherwise. Further, the term "user" used herein may refer to a network operator, a vendor, a service provider, or any suitable personnel associated with a node, unless explicitly stated otherwise. In addition, the terms "UL path" and "data path" as used herein may refer to an uplink path which may be utilized to transmit any suitable type of data.

Further, although only one master cell group (MCG), one secondary cell group (SCG), and one user equipment (UE) are described herein below, it is apparent that more than one MCG, more than one SCG, and/or more than one UE can be included in any of the example embodiments described herein.

Furthermore, although the example embodiments of the present disclosure are described herein in relation to utilizing UL path of a 4G LTE network system and UL path of a 5G NR network system, it is contemplated that the present disclosure is similarly applicable to utilization of uplink path of any other suitable technologies.

Example embodiments of the present disclosures provide a system and method to automatically and dynamically determine an optimal uplink (UL) data path for a user equipment (UE). Specifically, the system and method of the present disclosures may dynamically determine one or more UL performance of a UE in real-time or near real-time, and may then determine an UL path that is most optimal to the real-time or near real-time condition.

Accordingly, example embodiments of the present disclosures enable power efficient connectivity among UE and base stations under NSA deployment, reduce UE's transmit power wastage, improve UE's transmit power utilization among base stations, improve UL performance, and avoid poor user's experience.

FIG. 1 illustrates an example block diagram of a system 100 for managing one or more UL paths for one or more user equipment (UE), according to one or more embodiments.

Referring to FIG. 1, system 100 may comprise a master cell group (MCG) 110, a secondary cell group (SCG) 120, a network element management system 130, a processing engine 140, a performance management system 150, and a database 160.

The MCG 110 may comprise one or more nodes of a first technology, and the SCG 120 may comprise one or more nodes of a second technology. In the example embodiment illustrated in FIG. 1, the MCG 110 comprises one or more eNodeB 110-1 (i.e., 4G LTE base station) and the SCG 320 comprises one or more gNodeB 120-1 (i.e., 5G NR base station). One or more UE may establish a UL path with the one or more eNodeB (referred to as "LTE UL path" hereinafter), and may establish a UL path with the one or more gNodeB (referred to as "NR UL path" hereinafter)

On the other hand, the network element management system 130 may be communicatively coupled to the MCG 110, the SCG 120 and the processing engine 140. In some embodiments, the network element management system 130 may be configured to receive information or instruction from the processing engine 140, and to configure one or more nodes in the MCG 110 and/or the SCG 120 based on the received information or instruction. For instance, the network management system 130 may receive, from the processing engine 140, an information of one or more optimal UL paths, and may then adjust the parameters in the nodes (e.g., primary path related parameters in PDCP configuration information of RRC Connection Reconfiguration message, etc.) accordingly.

The network management system 130 may include an operational support system (OSS) and an element management system (EMS). In some embodiments, the network element management system 130 may include a plurality of EMSs, each of the plurality of EMSs may be configured to manage a single node or a group of nodes associated with a particular vendor/network service provider and/or associated with multiple technologies (e.g., LTE, 5G, etc.), and the OSS interfaces the plurality of EMSs and the processing engine 140. Accordingly, the network element management system 130 may provide a single control point for managing one or more nodes associated with multiple users (e.g., network operators, vendors, network service providers, etc.) and/or associated with multiple technologies via a centralized processing engine.

The processing engine 140 may be configured to obtain data or information from performance management system 150 and database 160, and may be configured to determine one or more optimal UL paths based on the obtained data or information. Subsequently, the processing engine 140 may be configured to provide information of the determined one or more optimal UL paths to the network element management system 130, and the network element management system 130 may then configure the associated node(s) based on the determined one or more optimal UL paths. In some embodiments, the processing engine 140 may comprise a rule-based processing engine, a network service orchestrator, or the like, which may be configured to provide end-to-end automation (e.g., on-boarding, instantiation, redeployment, healing, scaling, termination, etc.) for one or more nodes.

The performance management system 150 may be communicatively coupled to one or more UE, and may be configured to continuously (or periodically) measure, monitor, or receive performance data or information from the one or more UE in a real-time or near real-time. For instance, the performance management system 150 may measure, monitor, or receive performance parameters such as (but are not limited to): UL power headroom report (PHR) which indicates available UL transmit power of the associated UE, UL signal to interference and noise ratio (SINR) information which indicates the UL signal quality, and negative acknowledgement/not acknowledged (NACK) information which indicates the quality of data packet transmission (e.g., errors in data packets received by the UE, etc.). In some embodiments, the performance management system 150 may be configured to generate or derive one or more performance parameters based on other data or information. For instance, the performance management system 150 may derive the UL SINR information for a UE from a channel quality indicator (CQI) information of the UE. Alternatively, the performance management system 150 may collect or obtain the required data, parameters, or information from any other suitable resource(s), without departing from the scope of present disclosures.

The performance management system 150 may be configured to generate performance metrics based on the performance parameters described above. For instance, the performance management system 150 may: generate an average of UE reported PHR (referred to as "Avg (UE reported PHR)" hereinafter) based on the PHR received from the UE, derive an average of UL SINR (referred to as "Avg (derived UL SINR)" hereinafter) from UE CQI, and determine percentage of NACK reported by the UE (referred to as "% of reported NACK" hereinafter). Further, the performance management system 150 may be communicatively coupled to the processing engine 140, and may be configured to continuously (or periodically) provide the performance metrics to the processing engine 140. Accordingly, the processing engine 140 may utilize the performance metrics in determining one or more optimal UL paths.

On the other hand, the database 160 may be configured to store information associated with the UL path configuration of one or more nodes in MCG 110 and SCG 120. For instance, the database 160 may store parameters or information which defines quality of UL path, wherein said parameters or information may be pre-defined by a user (e.g., network operator, vendor, etc.) before deployment of the one or more nodes, and/or may be adjustable by said user after deployment of the one or more nodes.

By way of example, said parameters or information may be associated with the LTE UL path, such as:
  (a) minimal or lower limit of UL power headroom report (referred to as "Min_UL PHR Threshold_LTE" hereinafter), below which a LTE UL path quality is determined as poor and may be presented in the unit level of dBm, dB mW, or any other suitable unit level;
  (b) minimal or lower limit of UL SINR (referred to as "Min_UL SINR Threshold_LTE" hereinafter), below which a LTE UL path quality is determined as poor and may be presented in the unit level of dBm, dB mW, or any other suitable unit level;
  (c) maximum or upper limit of UL NACK (referred to as "Max_UL NACK Threshold_LTE" hereinafter), above which a LTE UL path quality is determined as poor and may be presented in the unit level of percentage (%) or any other suitable unit lever.

Similarly, said parameters or information may also be associated with the NR UL path, such as:
  (a) minimal or lower limit of UL power headroom report (referred to as "Min_UL PHR Threshold_NR" hereinafter), below which a NR UL path quality is determined as poor and may be presented in the unit level of dBm, dB mW, or any other suitable unit level;
  (b) minimal or lower limit of UL SINR (referred to as "Min_UL SINR Threshold_NR" hereinafter), below which a NR UL path quality is determined as poor and may be presented in the unit level of dBm, dB mW, or any other suitable unit level;
  (c) maximum or upper limit of UL NACK (referred to as "Max_UL NACK Threshold_NR" hereinafter), above which NR UL path quality is determined as poor and may be presented in the unit level of percentage (%) or any other suitable unit lever.

Further, the database 160 may also store any information or parameter required for determining or evaluating one or more optimal UL paths. For instance, database 160 may store a timer threshold (referred to as "T_Evaluation" hereinafter) defining the maximum time period for performing evaluation of UL path quality (e.g., a time period in which one or more criteria for determining a quality of UL path are required to be met before a decision of UL path switch is made, etc.). The parameter T_Evaluation is utilized to prevent overly frequent UL path changes, and may be pre-configured by the user (e.g., network operator, vendor, etc.) in any suitable range (e.g., in ms, etc.).

In some embodiments, the database 160 may comprise a configuration management database (CMDB) which is configured to receive said information (e.g., receive from network element system 130 or processing engine 140, receive directly from MCG 110 and/or SCG 120, etc.) and store said information thereafter. Further, the database 160 may be communicatively coupled to the processing engine 140 and may be configured to provide (e.g., automatically or periodically provide, provide in response to a request or an event, etc.) one or more stored information or parameter to the processing engine 140.

Although it is illustrated in FIG. 1 that the network element management system 130, the processing engine 140, the performance management system 150, and the database 160 are separated from the nodes of MCG 310 (e.g., eNodeB 110-1, etc.) and from the nodes of SCG 120 (e.g., gNodeB 120-1, etc.), it is contemplated that one or more of the network element management system 130, the processing engine 140, the performance management system 150, and the database 160 may be implemented in one or more nodes of MCG 310 and/or SCG 320, without departing from the scope of the present disclosure. For instance, in some embodiments, each of the nodes in the MCG 110 and/or SCG 120 (i.e., eNodeB 110-1, gNodeB 120-1, etc.) may include at least one processing engine (similar to processing engine 140), and the performance parameters are directly obtained by the at least one processing engine and the process of determination or evaluation of optimal UL path is performed at the node side (i.e., within the eNodeB or gNodeB). Alternatively, the database 160 and the performance management system 150 may be comprised in one single module, and/or may be included in one or more nodes of MCG 310 and/or SCG 320.

Several example operations according to one or more embodiments are described below with reference to FIG. 2 to FIG. 9.

Figure 2:
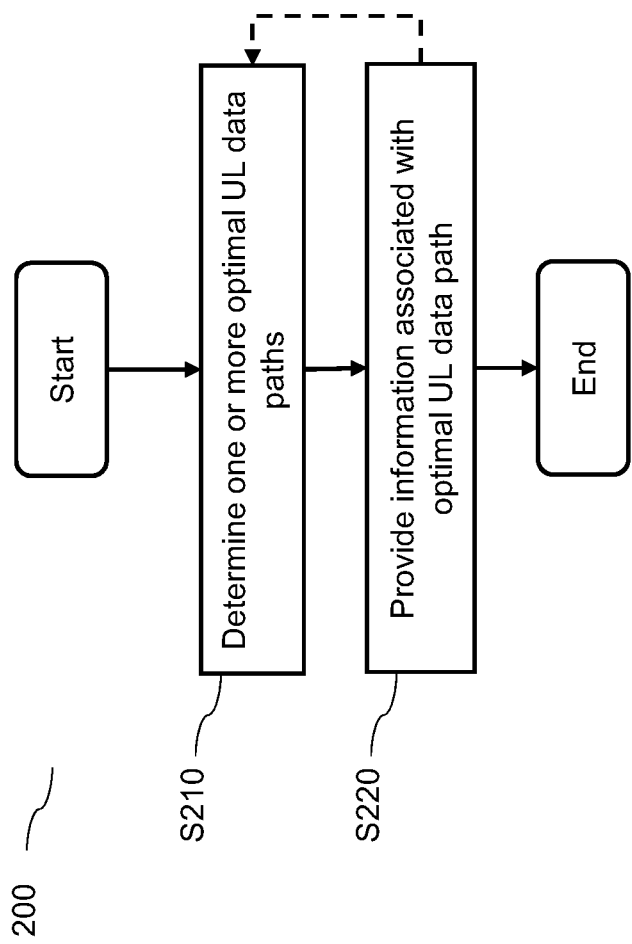
FIG. 2 illustrates an example flow diagram of a method for managing one or more optimal UL paths for one or more UE, according to one or more embodiments.

FIG. 2 illustrates an example flow diagram of a method 200 for managing one or more optimal UL paths for one or more UE, according to one or more embodiments. Method 200 may be performed by processing engine 140 in FIG. 1.

Referring to FIG. 2, at operation S210, one or more optimal UL paths are determined. Specifically, the processing engine 140 may be configured to determine one or more optimal UL paths for one or more UE. Further discussion on the process of determining optimal UL path is provided below with reference to FIG. 3.

At operation S220, information associated with determined optimal UL path is provided to the respective UE. For instance, the processing engine 140 may be configured to provide UL path parameters associated with the determined optimal UL path (such as (1) primaryPath, and (2) ul-DataSplitThreshold of DPCP configuration information as described above) to network element management system 130, such that network element management 130 may configure the nodes to update the associated UL path parameters accordingly. Subsequently, the respective node may provide the updated UL path parameters to the respective UE (e.g., via RRC Connection Reconfiguration message, etc.). Alternatively, in the case where the processing engine 140 is an element of the nodes of MCG or SCG, the processing engine may be configured to directly configure the UL path parameters based on the determined optimal UL path, and subsequently provide the configured UL path parameters to the respective UE (e.g., via RRC Connection Reconfiguration message, etc.).

Upon receiving the updated or configured UL path parameters, the respective UE may perform an UL path switch operation based on the received UL path parameters, so as to change the UL path(s) (e.g., suboptimal LTE UL path, suboptimal NR UL path, etc.) to the determined optimal UL path(s) (e.g., optimal LTE UL path, optimal NR UL path, etc.). Further discussion on an example configuration of the UL path parameters is provided below with reference to FIG. 9.

In some embodiments, after operation S220, the process may return to operation S210, in which the processing engine 140 may be configured to again determine one or more optimal UL paths for the one or more UE. In this way, the processing engine 140 may continuously or iteratively determine one or more optimal UL paths for the respective UE, and may thereby enable dynamic switching of UL path according to real-time or near real-time UL path quality or UL performance.

Figure 3:
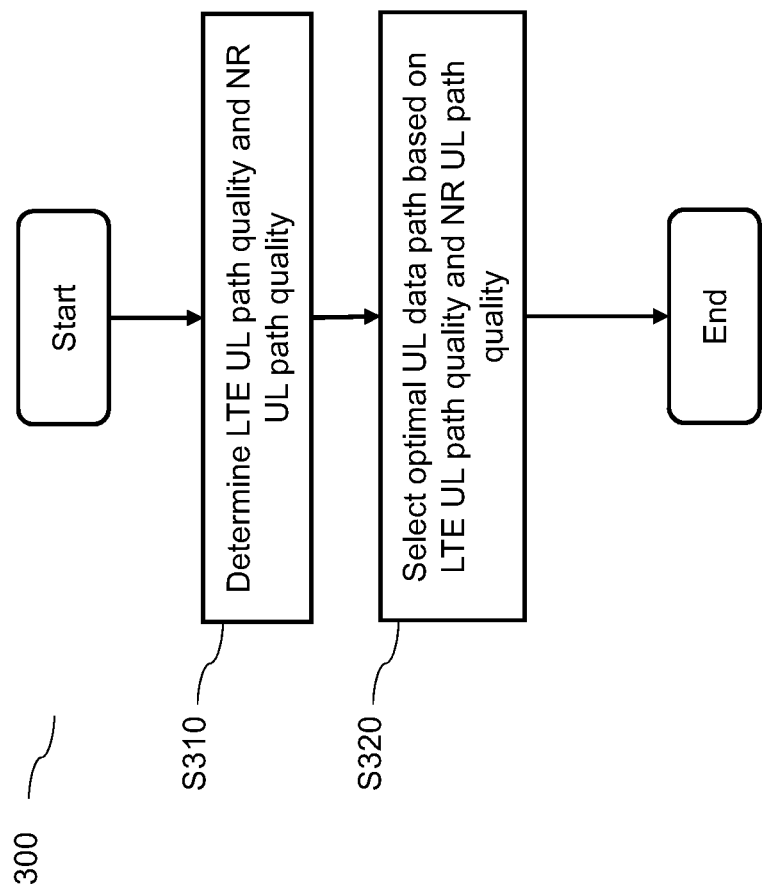
FIG. 3 illustrates an example flow diagram of a method for determining one or more optimal UL data paths, according to one or more embodiments.

FIG. 3 illustrates an example flow diagram of a method 300 for determining one or more optimal UL paths, according to one or more embodiments. Method 300 may be part of operation S210 in FIG. 2, and may be performed by processing engine 140 in FIG. 1.

Referring to FIG. 3, at operation S310, LTE UL path quality and NR UL path quality are determined. Specifically, the processing engine 140 may be configured to determine quality of a UL path(s) the respective UE is utilizing, and the determined quality of a UL path(s) may be utilized in selecting one or more optimal UL paths. In the example embodiment illustrated in FIG. 3, it is assumed that the UE is utilizing a LTE UL path and a NR UL path, thus at operation S310 the quality of LTE UL path (referred to as "LTE UL path quality" hereinafter) and the quality of NR UL path quality (referred to as "NR UL path quality" hereinafter) are determined by the processing engine 140. Further discussion on the process of determining LTE UL path quality is provided below with reference to FIG. 4, and further discussion on the process of determining NR UL path quality is provided below with reference to FIG. 5.

At operation S320, one or more optimal UL paths are selected based on the determined LTE UL path quality and NR UL path quality. Specifically, the processing engine 140 may be configured to select one or more optimal UL paths based on the determined LTE UL path quality and NR UL path quality. Further discussion on the process of selecting the one or more optimal UL paths is provided below with reference to FIG. 6.

Figure 4:
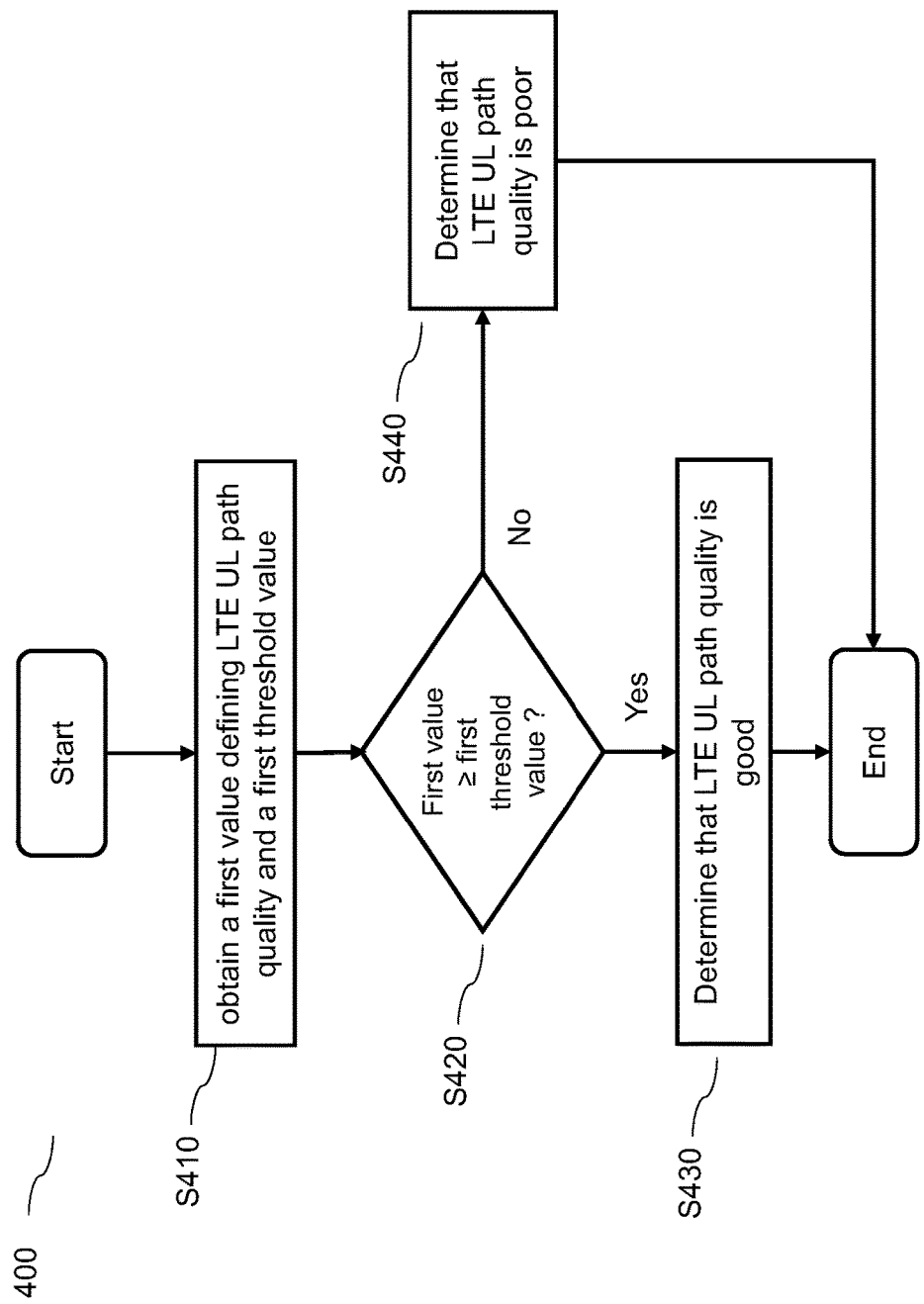
FIG. 4 illustrates an example flow diagram of a method for determining LTE UL path quality, according to one or more embodiments.

FIG. 4 illustrates an example flow diagram of a method 400 for determining LTE UL path quality, according to one or more embodiments. Method 400 may be part of operation S310 in FIG. 3, and be performed by processing engine 140 in FIG. 1.

Referring to FIG. 4, at operation S410, a first value defining the LTE UL path quality and a first threshold value are obtained. Specifically, the processing engine 140 may be configured to obtain the first value and the first threshold value associated therewith. The first threshold value may be pre-defined by a user (e.g., network operator, vendor, etc.) to define the LTE UL path quality. Further discussion on the process of obtaining the first value is provided below with reference to FIG. 6.

At operation S420, the first value is compared to the first threshold value. Specifically, the processing engine 140 may be configured to determine whether or not the first value is greater than or equal to the first threshold value. Based on determining that the first value is greater than or equal to the first threshold value, the process proceeds to operation S430, at which the processing engine 140 may determine that the LTE UL path quality is good. On the other hand, based on determining that the first value is less than (i.e., not greater than or equal to) the first threshold value, the processing engine 140 may determine that the LTE UL path quality is poor.

By way of example, assuming that the first threshold value is "1", based on determining that the first value is greater than or equal to 1, the processing engine 140 may determine that the LTE UL path quality is good. On the other hand, based on determining that the first value is less than 1 (e.g., the first value may be "0"), the processing engine 140 may determine that the LTE UL path quality is poor.

Figure 5:
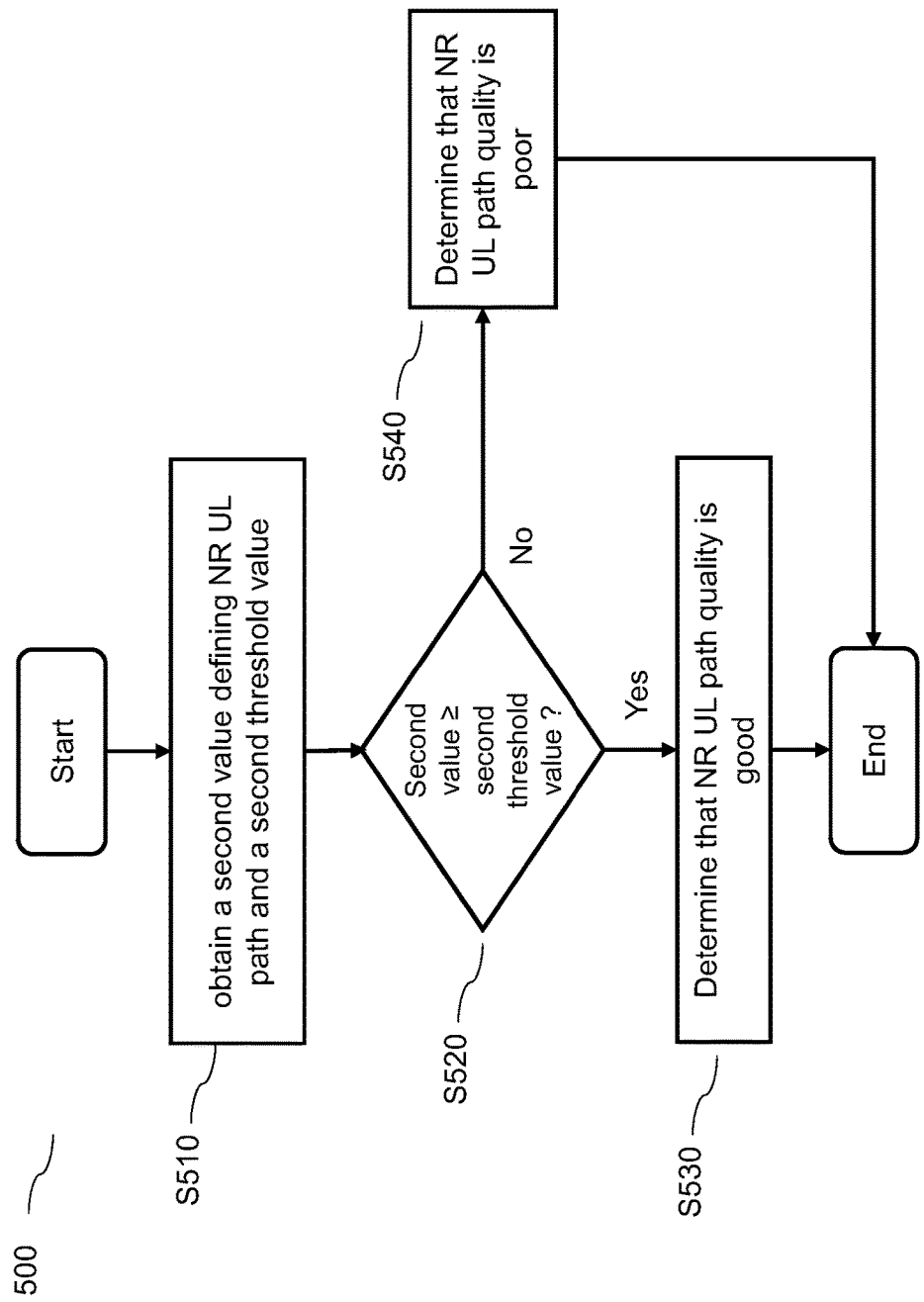
FIG. 5 illustrates an example flow diagram of a method for determining NR UL path quality, according to one or more embodiments.

FIG. 5 illustrates an example flow diagram of a method 500 for determining NR UL path quality, according to one or more embodiments. Method 500 may be part of operation S310 in FIG. 3, and be performed by processing engine 140 in FIG. 1.

Referring to FIG. 5, at operation S510, a second value defining the NR UL path quality and a second threshold value are obtained. Specifically, the processing engine 140 may be configured to obtain the second value and the second threshold value associated therewith. Similar to the first threshold value as described in relation to FIG. 4, the second threshold value may be pre-defined by a user (e.g., network operator, vendor, etc.) to define the NR UL path quality. Further discussion on the process of obtaining the second value is provided below with reference to FIG. 7.

At operation S520, the second value is compared to the second threshold value. Specifically, the processing engine 140 may be configured to determine whether or not the second value is greater than or equal to the second threshold value. Based on determining that the second value is greater than or equal to the second threshold value, the process proceeds to operation S530, at which the processing engine 140 may determine that the NR UL path quality is good. On the other hand, based on determining that the second value is less than (i.e., not greater than or equal to) the second threshold value, the processing engine 140 may determine that the NR UL path quality is poor.

Similar to the example as described above in relation to FIG. 4, assuming that the second threshold value is "1", based on determining that the second value is greater than or equal to 1, the processing engine 140 may determine that the NR UL path quality is good. On the other hand, based on determining that the second value is less than 1 (e.g., the second value may be "0"), the processing engine 140 may determine that the NR UL path quality is poor.

Referring to FIG. 4 and FIG. 5, it is contemplated that method 400 and method 500 may be performed concurrently with each other (e.g., the processing engine 140 may perform method 400 and method 500 at the same time or with some overlap) or may be performed subsequently to one another (e.g., the processing engine 140 may perform method 400 first then perform method 500, may perform method 500 first then perform method 400, etc.). Further, it is apparent that the first threshold value and the second threshold value may have the same value or may have different values. Furthermore, it can be understood that the first threshold value and the second threshold value may have any value other than "1" as exemplified above, and can have any suitable values as per defined by the user, without departing from the scope of the present disclosure.

The operations of determining or selecting the first value and the second value are described below with reference to FIG. 6 and FIG. 7, respectively.

Figure 6:
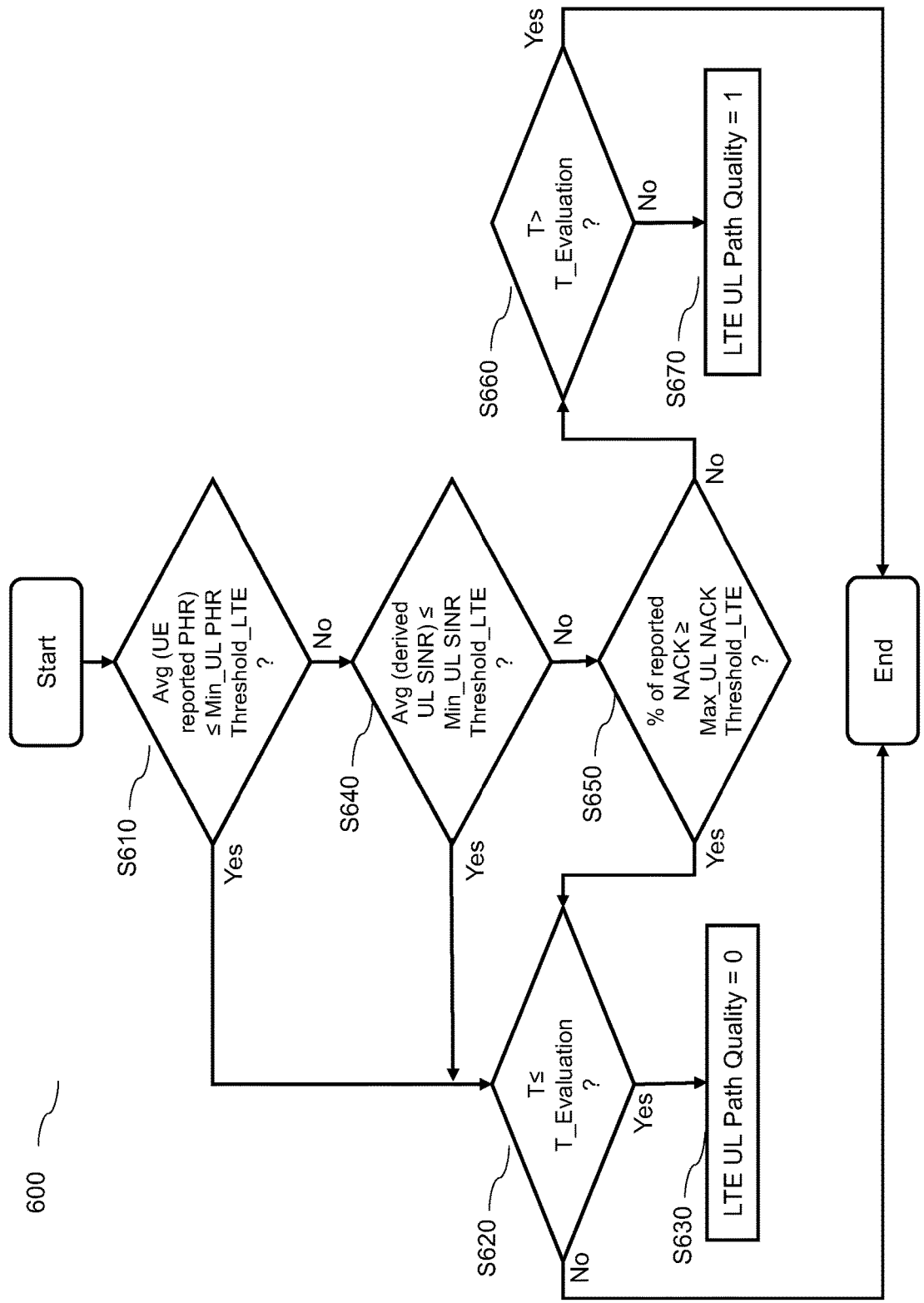
FIG. 6 illustrates an example flow diagram of a method for determining a value defining LTE UL path quality, according to one or more embodiments.

FIG. 6 illustrates an example flow diagram of a method 600 for determining a value defining LTE UL path quality (e.g., the first value described above in relation to FIG. 4), according to one or more embodiments. Method 600 may be part of operation S410 in FIG. 4, and may be performed by processing engine 140 in FIG. 1. Further, method 600 may be performed based on information or data obtained from or provided by performance management system 150 (e.g., Avg (UE reported PHR), Avg (derived UL SINR), % of reported NACK, etc.) and information or data obtained from or provided by database 160 (e.g., performance metrics such as Min_UL PHR Threshold_LTE, Min_UL_SINR Threshold_LTE, Max_UL NACK Threshold_LTE, T_Evaluation, etc.).

Referring to FIG. 6, at operation S610, a first parameter is compared to a first threshold. For instance, the processing engine 140 may be configured to compare an average of UE reported PHR (illustrated as "Avg (UE reported PHR)" in FIG. 6) to a threshold defining the minimal or lower limit of LTE UL power headroom report (illustrated as "Min_UL PHR Threshold_LTE" in FIG. 6).

Based on determining that Avg (UE reported PHR) is smaller than or equal to Min_UL PHR Threshold_LTE, the processing engine 140 determines that the LTE UL path quality is poor (since the average of UE reported PHR does not exceed the minimal or lower limit of LTE UL power headroom report), and the process proceeds to operation S620. Otherwise, based on determining that Avg (UE reported PHR) is greater than Min_UL PHR Threshold_LTE (i.e., the average of UE reported PHR fulfills the minimal or lower limit of LTE UL power headroom report), the process proceeds to operation S640.

At operation S620, a value of a timer is compared to a timer threshold. Specifically, the processing engine 140 may be configured to trigger a timer (illustrated as "T" in FIG. 6) as soon as method 600 is initiated (i.e., at the beginning of operation S610), and compare the value of the timer to the timer threshold (illustrated as "T_Evaluation" in FIG. 6), so as to determine whether or not the time taken for performing the previous operations (e.g., any of operations S610 to S650, etc.) are within a pre-defined maximum time period, before determining or setting the value defining LTE UL path quality. In this example embodiment, at operation S620, the processing engine 140 may be configured to determine whether or not T is smaller than or equal to T_Evaluation. Nevertheless, it is contemplated that the processing engine 140 may also determine whether or not T is greater than T_Evaluation, without departing from the scope of the present disclosure.

Referring still to FIG. 6, based on determining that T is smaller than or equal to T_Evaluation, the process proceeds to operation S630, in which a value of "0" is assigned to define the LTE UL path quality as "poor". Otherwise, the process ends without any change or selection on the value defining LTE UL path quality.

At operation S640, a second parameter is compared to a second threshold. For instance, the processing engine 140 may be configured to compare an average of LTE UL SINR derived from UE CQI (illustrated as "Avg (derived UL SINR)" in FIG. 6) to a threshold defining minimal or lower limit of LTE UL SINR (illustrated as "Min_UL SINR Threshold_LTE" in FIG. 6).

Based on determining that Avg (derived UL SINR) is smaller than or equal to Min_UL SINR Threshold_LTE, the processing engine 140 determines that the LTE UL path quality is poor (since the average of UL SINR does not exceed the minimal or lower limit of UL SINR), and the process proceeds to operation S620 (and operation S630, if applicable). Otherwise, based on determining that Avg (derived UL SINR) is greater than Min_UL SINR Threshold- _LTE (i.e., the average of LTE UL SINR fulfills the minimal or lower limit of LTE UL SINR), the process proceeds to operation S650.

At operation S650, a third parameter is compared to a third threshold. For instance, the processing engine 140 may be configured to compare a percentage of NACK reported by the UE (illustrated as "% of reported NACK" in FIG. 6) to a threshold defining maximum or upper limit of LTE UL NACK (illustrated as "Max_UL NACK Threshold_LTE" in FIG. 6).

Based on determining that % of reported NACK is greater than or equal to Max_UL NACK Threshold_LTE, the processing engine 140 determines that the LTE UL path quality is poor (since the percentage of NACK reported by the UE has exceeded or reached the maximum or upper limit of LTE UL NACK), and the process proceeds to operation S620 (and operation S630, if applicable). Otherwise, based on determining that % of reported NACK is smaller than Max_UL NACK Threshold_LTE (i.e., the percentage of NACK reported by the UE is within the maximum or upper limit of UL NACK), the process proceeds to operation S660.

Similar to operation S620, at operation S660, the value of a timer (T) is compared to the timer threshold (T_Evaluation). In this example embodiment, the processing engine 140 may be configured to determine whether or not T is greater than T_Evaluation. Nevertheless, it is contemplated that at operation S660, the processing engine 140 may determine whether or not T is smaller than or equal to T_Evaluation, without departing from the scope of the present disclosure.

Referring still to FIG. 6, based on determining that T is greater than T_Evaluation, the process proceeds to operation S670, in which a value of "1" is assigned to define the LTE UL path quality as "good". Otherwise, the process ends without any change or selection on the value defining LTE UL path quality.

It can be understood that the operation(s) for comparing T to T_Evaluation is to ensure that the time taken for performing the operations (e.g., any of operations S610 to S650, etc.) are within a pre-defined maximum time period, before setting or assigning the value for defining the LTE UL path quality, and it is contemplated that operation S620 and S660 may be similar to each other, without departing from the scope of the present disclosure.

For instance, according to an embodiment, based on determining that at least one parameter (e.g., one or more of the first parameter, the second parameter, and the third parameter, etc.) does not fulfill a condition defined by a threshold associated with the parameter (e.g., one or more of the first threshold, the second threshold, and the third threshold, etc.), the processing engine 140 may first determine whether or not the timer value (T) fulfills a condition defined by the timer threshold (T_Evaluation), such as condition (T≤T_Evaluation) or (T>T_Evaluation). Accordingly, based on determining that the at least one parameter does not fulfill the condition defined by the threshold and based on determining that the timer value fulfills the condition defined by the timer threshold, the processing engine 140 may assign a value defining that the LTE UL path quality is good (e.g., "1", etc.). Conversely, based on determining that the at least one parameter fulfills the condition defined by the threshold and based on determining that the timer value fulfills the condition defined by the timer threshold, the processing engine 140 may assign a value defining that the LTE UL path quality is poor (e.g., "0", etc.).

Figure 7:
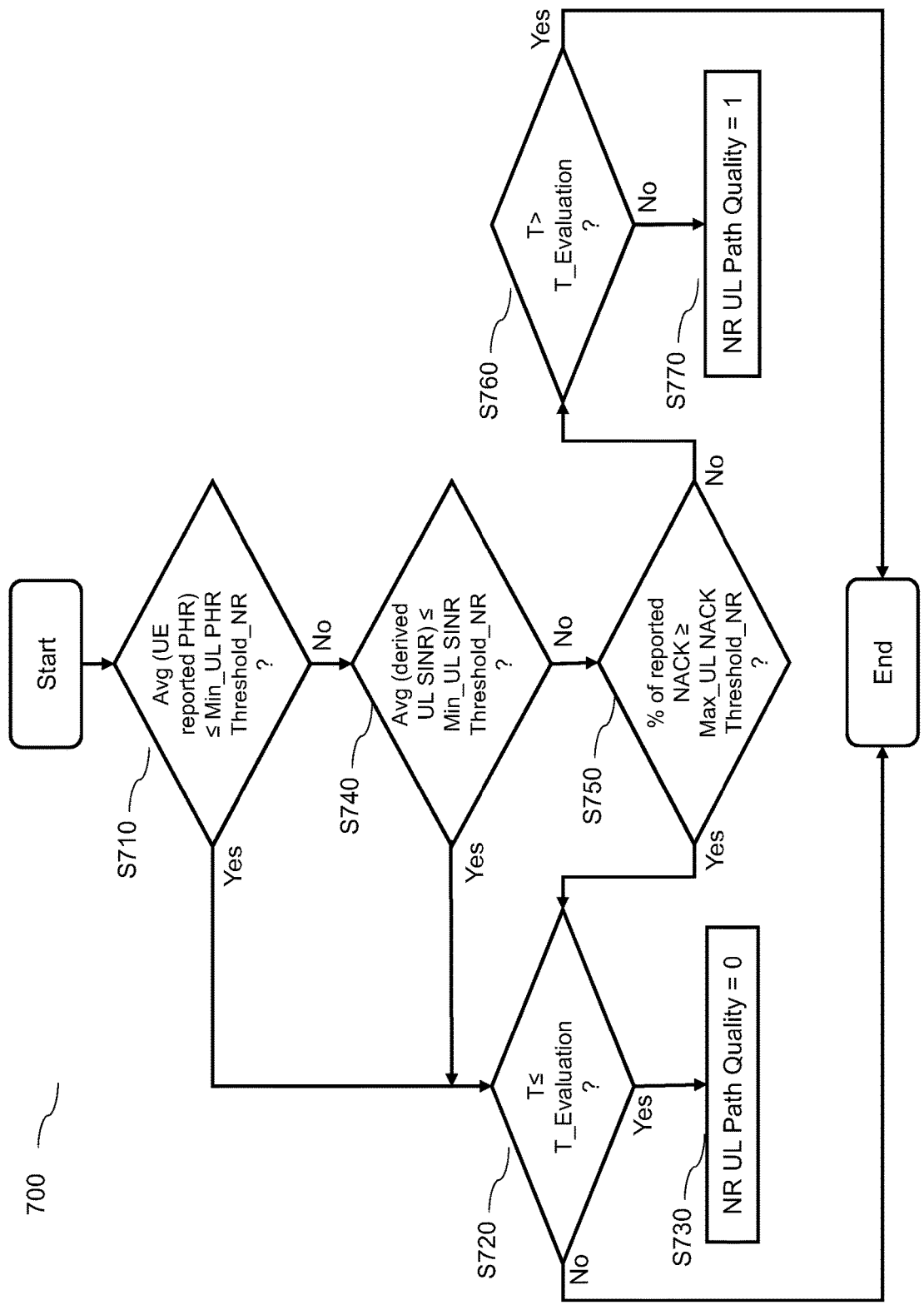
FIG. 7 illustrates an example flow diagram of a method for determining a value defining NR UL path quality, according to one or more embodiments.

FIG. 7 illustrates an example flow diagram of a method 700 for determining a value defining NR UL path quality (e.g., the second value described above in relation to FIG. 5), according to one or more embodiments. Method 700 may be part of operation S510 in FIG. 5, and be performed by processing engine 140 in FIG. 1. Further, method 700 may be performed based on information or data obtained from or provided by performance management system 150 (e.g., Avg (UE reported PHR), Avg (derived UL SINR), % of reported NACK, etc.) and information or data obtained from or provided by database 160 (e.g., performance metrics such as Min_UL PHR Threshold_NR, Min_UL_SINR Threshold_NR, Max_UL NACK Threshold_NR, T_Evaluation, etc.). Furthermore, one or more operations in method 700 may be similar to one or more operations in method 600 of FIG. 6, thus redundant descriptions associated therewith may be omitted below for conciseness.

Referring to FIG. 7, at operation S710, a first parameter is compared to a first threshold. Specifically, the processing engine 140 may be configured to compare average of UE reported PHR (illustrated as "Avg (UE reported PHR)" in FIG. 7) to a threshold defining the minimal or lower limit of NR UL power headroom report (illustrated as "Min_UL PHR Threshold_NR" in FIG. 7).

Based on determining that Avg (UE reported PHR) is smaller than or equal to Min_UL PHR Threshold_NR, the processing engine 140 determines that the NR UL path quality is poor (since the average of UE reported PHR does not exceed the minimal or lower limit of NR UL power headroom report), and the process proceeds to operation S720. Otherwise, based on determining that Avg (UE reported PHR) is greater than Min_UL PHR Threshold_NR (i.e., the average of UE reported PHR fulfills the minimal or lower limit of NR UL power headroom report), the process proceeds to operation S740.

At operation S720, a value of a timer (illustrated as "T" in FIG. 7) is compared to a timer threshold. In this example embodiment, at operation S720, the processing engine 140 may be configured to determine whether or not T is smaller than or equal to T_Evaluation. Nevertheless, it is contemplated that the processing engine 140 may also determine whether or not T is greater than T_Evaluation.

Based on determining that T is smaller than or equal to T_Evaluation, the process proceeds to operation S730, in which a value of "0" is assigned to define the NR UL path quality as "poor". Otherwise, the process ends without any change or selection on the value defining NR UL path quality.

At operation S740, a second parameter is compared to a second threshold. Specifically, the processing engine 140 may be configured to compare an average of NR UL SINR derived from UE CQI (illustrated as "Avg (derived UL SINR)" in FIG. 7) to a threshold defining minimal or lower limit of NR UL SINR (illustrated as "Min_UL SINR Threshold_NR" in FIG. 7).

Based on determining that Avg (derived UL SINR) is smaller than or equal to Min_UL SINR Threshold_NR, the processing engine 140 determines that the NR UL path quality is poor (since the average of NR UL SINR does not exceed the minimal or lower limit of NR UL SINR), and the process proceeds to operation S720 (and operation S730, if applicable). Otherwise, based on determining that Avg (derived UL SINR) is greater than Min_UL SINR Threshold_NR (i.e., the average of NR UL SINR fulfills the minimal or lower limit of NR UL SINR), the process proceeds to operation S750.

At operation S750, a third parameter is compared to a third threshold. Specifically, the processing engine 140 may be configured to compare a percentage of NACK reported by the UE (illustrated as "% of reported NACK" in FIG. 7) to a threshold defining maximum or upper limit of NR UL NACK (illustrated as "Max_UL NACK Threshold_NR" in FIG. 7).

Based on determining that % of reported NACK is greater than or equal to Max_UL NACK Threshold_NR, the processing engine 140 determines that the NR UL path quality is poor (since the percentage of NACK reported by the UE has exceeded or reached the maximum or upper limit of UL NACK), and the process proceeds to operation S720 (and operation S730, if applicable). Otherwise, based on determining that % of reported NACK is smaller than Max_UL NACK Threshold_NR (i.e., the percentage of NACK reported by the UE is within the maximum or upper limit of NR UL NACK), the process proceeds to operation S760.

Similar to operation S720, at operation S760, the value of a timer (T) is compared to the timer threshold (T_Evaluation). In this example embodiment, the processing engine 140 may be configured to determine whether or not T is greater than T_Evaluation. Nevertheless, it is contemplated that at operation S760, the processing engine 140 may determine whether or not T is smaller than or equal to T_Evaluation, without departing from the scope of the present disclosure.

Referring still to FIG. 7, based on determining that T is greater than T_Evaluation, the process proceeds to operation S770, in which a value of "1" is assigned to define the NR UL path quality as "good". Otherwise, the process ends without any change or selection on the value defining NR UL path quality.

It can be understood that operation S720 and S760 may be similar to each other, without departing from the scope of the present disclosure. For instance, according to an embodiment, based on determining that at least one parameter (e.g., one or more of the first parameter, the second parameter, and the third parameter, etc.) does not fulfill a condition defined by a threshold associated with the parameter (e.g., one or more of the first threshold, the second threshold, and the third threshold, etc.), the processing engine 140 may first determine whether or not the timer value (T) fulfills a condition defined by the timer threshold (T_Evaluation), such as condition (T≤T_Evaluation) or (T>T_Evaluation). Accordingly, based on determining that the at least one parameter does not fulfill the condition defined by the threshold and based on determining that the timer value fulfills the condition defined by the timer threshold, the processing engine 140 may assign a value defining that the NR UL path quality is good (e.g., "1", etc.). Conversely, based on determining that the at least one parameter fulfills the condition defined by the threshold and based on determining that the timer value fulfills the condition defined by the timer threshold, the processing engine 140 may assign a value defining that the NR UL path quality is poor (e.g., "0", etc.)

Further, it is contemplated that one or more operations in method 600 (of FIG. 6) and method 700 (of FIG. 7) may be performed in a sequence different from those illustrated in FIG. 6 and FIG. 7, or the parameters being compared in said one or more operations may be different, without departing from the scope of the present disclosure. For instance, at operation S610, processing engine 140 may be configured to compare Avg (derived UL SINR) to Min_UL SINR Threshold LTE, instead of configured to compare Avg (UE reported PHR) to Min_UL PHR Threshold_LTE. Furthermore, it can be understood that the processing engine 140 may be configured to compare more or less parameters as described above (e.g., operations S640 may be excluded from method 600, an additional operation X may be added between operation S640 and operation S650, etc.), without departing from the scope of the present disclosure.

Figure 8:
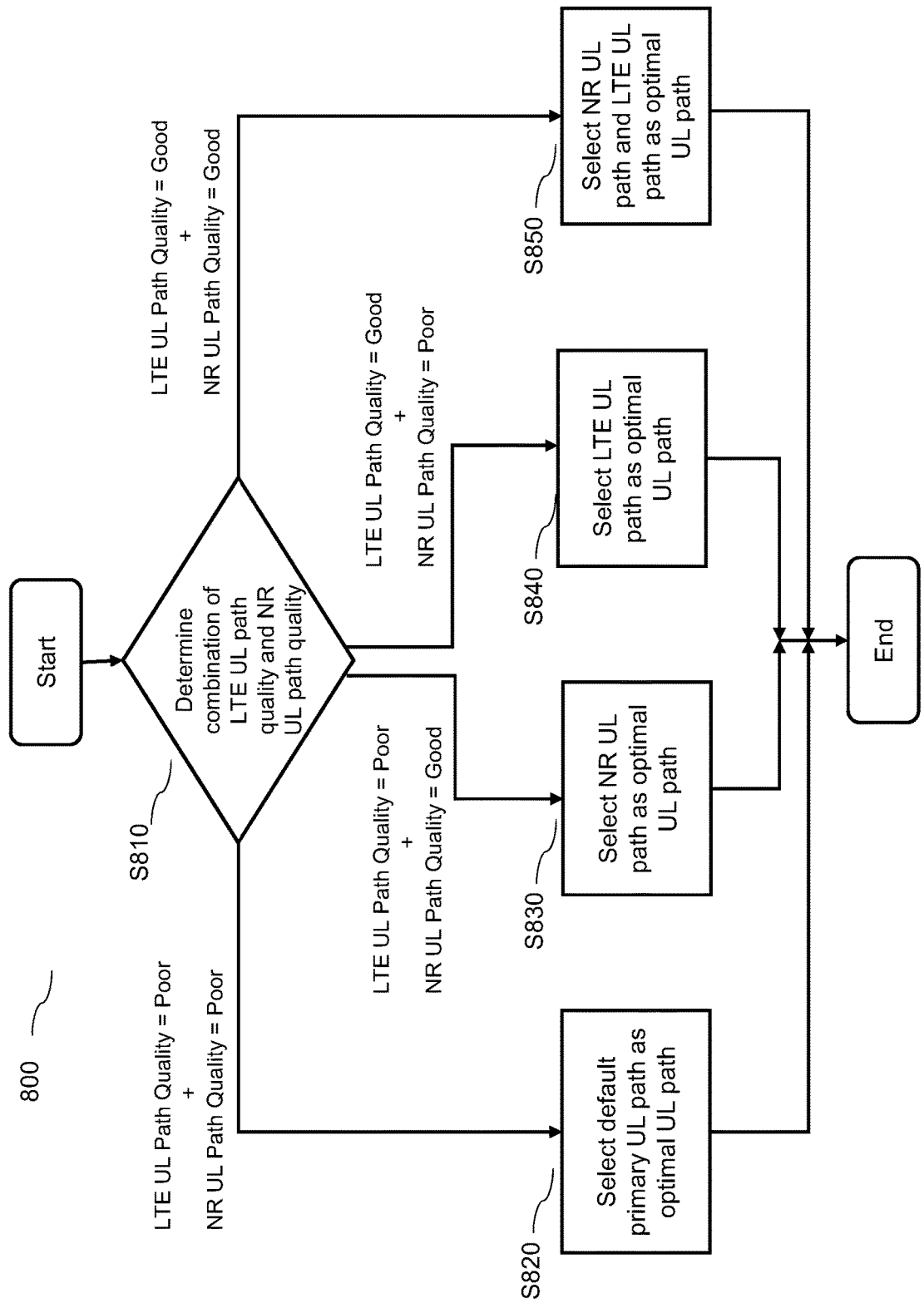
FIG. 8 illustrates an example flow diagram of a method for selecting one or more optimal UL paths, according to one or more embodiments.

FIG. 8 illustrates an example flow diagram of a method 800 for selecting one or more optimal UL paths, according to one or more embodiments. Method 800 may be part of operation S320 in FIG. 3, and be performed by processing engine 140 in FIG. 1.

Referring to FIG. 8, at operation S810, a combination of LTE UL path quality and NR UL path quality of a UE is determined. Specifically, the processing engine 140 may be configured to obtain LTE UL path quality (e.g., result or output from method 400 in FIG. 4) and NR UL path quality (e.g., result or output from method 500 in FIG. 5) and may be configured to determine a combination of the LTE UL path quality and NR UL path quality therefrom.

Accordingly, one or more optimal UL paths are selected in the subsequent operation. Specifically, the processing engine 140 may be configured to select one or more optimal UL paths (e.g., UL path) based on the determined combination. A summary of the combination of LTE UL path quality and NR UL path quality, and the associated selection of optimal UL path(s) and the associated operations in method 800, may be presented in the following table:

| LTE UL Path Quality | NR UL Path Quality | Optimal UL Path (s) | Operation |
| --- | --- | --- | --- |
| Poor | Poor | Default Primary UL Path | S820 |
| Poor | Good | NR | S830 |
| Good | Poor | LTE | S840 |
| Good | Good | LTE + NR | S850 |

Specifically, based on determining that both of the LTE UL path quality and NR UL path quality are poor, the process proceeds to operation S820, at which the processing engine 140 may be configured to determine or select the default primary UL path as the optimal UL path. The default primary UL path may be an UL path preconfigured by a user (e.g., network operator, vendor, etc.), and the default primary UL path may be preconfigured in the initial UL path parameter (e.g. cell group ID of PrimaryPath parameter in PDCP Configuration Information of RRC Connection Reconfiguration message, etc.). In this regards, if the UL path which the UE is utilizing when method 800 is performed is the same with the preconfigured UL path, the process may end without any change or selection on the optimal UL path.

Alternatively, based on determining that the LTE UL path quality is poor and the NR UL path quality is good, the process proceeds to operation S830, at which the processing engine 140 may be configured to determine or select the NR UL path as the optimal UL path.

On the other hand, based on determining that the LTE UL path quality is good and the NR UL path quality is poor, the process proceeds to operation S840, at which the processing engine 140 may be configured to determine or select the LTE UL path as the optimal UL path.

Further still, based on determining that both of the LTE UL path quality and NR UL path quality are good, the process proceeds to operation S850, at which the processing engine 140 may be configured to determine or select both the LTE UL path and NR UL path as the optimal UL paths.

As discussed above in relation to FIG. 2, after the one or more optimal UL paths were determined, the information associated therewith will be provided to the associated UE. Specifically, if the determined one or more optimal UL paths are different from the UL path(s) which the UE is utilizing, the Cell Group ID associated with the determined one or more optimal UL paths may be provided to the UE such that the UE may perform a path switching operation to change the UL path to the determined one or more optimal UL paths.

In some embodiments, in addition to Cell Group ID, the ul-DataSplitThreshold parameters may also be configured according to the determined one or more optimal UL paths. FIG. 9 illustrates a table containing example configurations of UL parameters (e.g., cell group ID, ul-DataSplitThreshold, etc.), according to one or more embodiments.

Referring to FIG. 9, when both of the LTE UL path quality and NR UL path quality are poor (e.g., the associated values are "0", etc.), the Cell Group ID may be "0" indicating that the preconfigured primary UL path should be utilized, and the ul-DataSplitThreshold may remain the same as the predetermined threshold.

On the other hand, when the LTE UL path quality is poor and the NR UL path quality is good (e.g., the value associated with the LTE UL path quality is "0" and the value associated with the NR UL path quality is "1", etc.), the Cell Group ID may be any suitable ID indicating that the NR UL path should be utilized, and the ul-DataSplitThreshold may be configured to infinity. In this way, upon completion of the path switching, the UE may utilize all UL transmit power on NR UL path, which in turn ensures reliable UL connectivity and stable network performance.

Similarly, when the LTE UL path quality is good and the NR UL path quality is poor (e.g., the value associated with the LTE UL path quality is "1" and the value associated with the NR UL path quality is "2", etc.), the Cell Group ID may be any suitable ID indicating that the LTE UL path should be utilized, and the ul-DataSplitThreshold may be configured to infinity. Similarly, upon completion of the path switching, the UE may utilize all UL transmit power on LTE UL path, which in turn ensures reliable UL connectivity and stable network performance.

Further, when both of the LTE UL path quality and NR UL path quality are good (e.g., the associated values are "1", etc.), the Cell Group IDs may be any suitable IDs indicating that the LTE UL path and NR UL path should be utilized, and the ul-DataSplitThreshold may remain the same as the predetermined threshold, so that the LTE UL path and NR UL path can share the UL transmit power as preconfigured.

It is contemplated that the configurations illustrated in FIG. 9 are merely example configurations, and one or more of the configurations (e.g., value defining LTE UL path quality, value defining NR UL path quality, cell group ID, ul-DataSplitThreshold, etc.) may be different without departing from the scope of the present disclosure.

Figure 10:
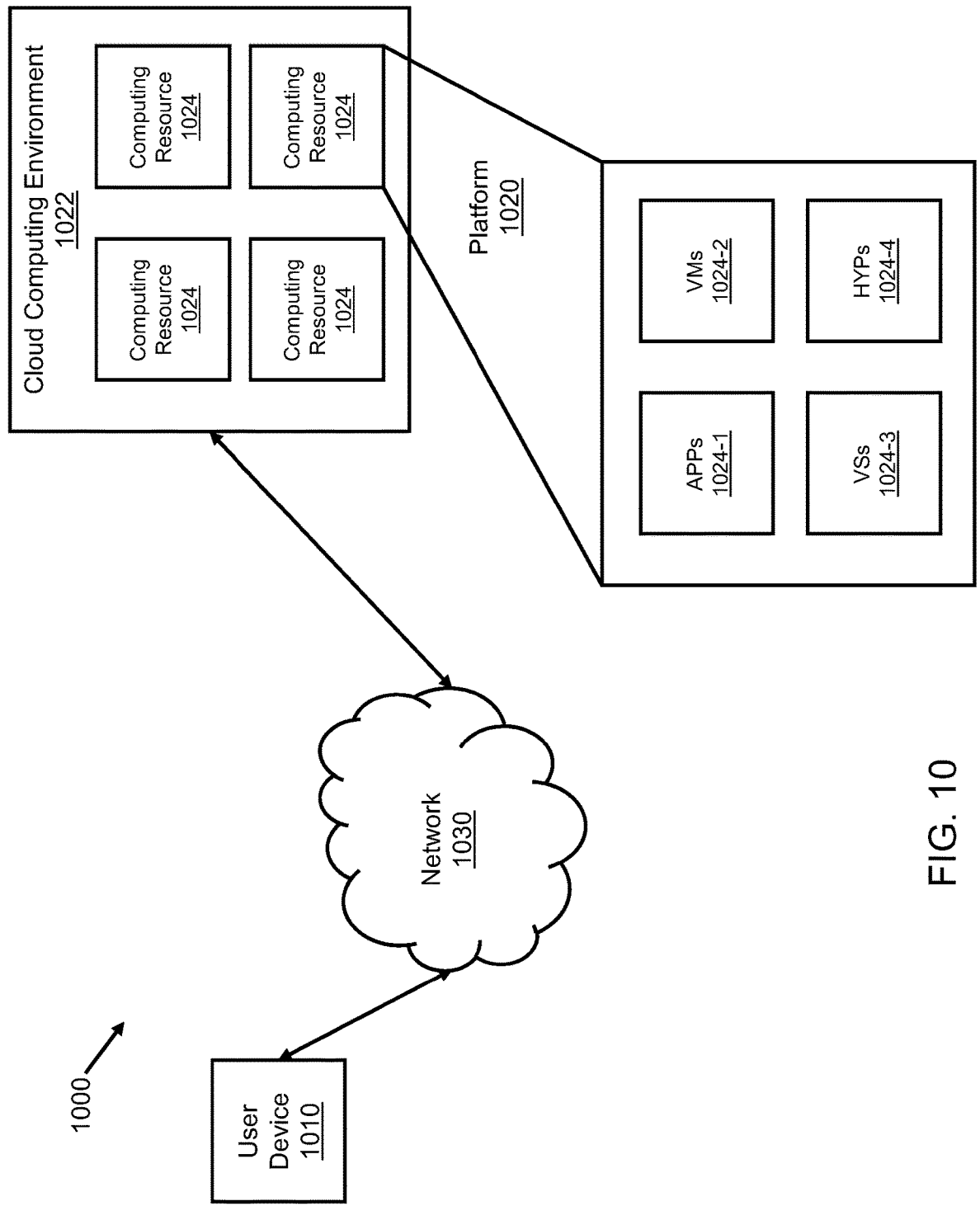
FIG. 10 is a diagram of an example environment in which systems and/or methods, described herein, may be implemented.

FIG. 10 is a diagram of an example environment 1000 in which systems and/or methods, described herein, may be implemented. As shown in FIG. 10, environment 1000 may include a user device 1010, a platform 1020, and a network 1030. Devices of environment 1000 may interconnect via wired connections, wireless connections, or a combination of wired and wireless connections. In embodiments, any of the functions and operations described with reference to FIG. 1 through FIG. 9 above may be performed by any combination of elements illustrated in FIG. 10.

User device 1010 includes one or more devices capable of receiving, generating, storing, processing, and/or providing information associated with platform 1020. For example, user device 1010 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), a SIM-based device, or a similar device. In some implementations, user device 1010 may receive information from and/or transmit information to platform 1020. In some embodiments, user device 1010 may corresponds to the user equipment (UE) described above in relation to FIG. 1 through FIG. 9.

Platform 1020 includes one or more devices capable of receiving, generating, storing, processing, and/or providing information. In some implementations, platform 1020 may include a cloud server or a group of cloud servers. In some implementations, platform 1020 may be designed to be modular such that certain software components may be swapped in or out depending on a particular need. As such, platform 1020 may be easily and/or quickly reconfigured for different uses. In some embodiments, one or more of database 160, performance management system 150, processing engine 140, and network element management system 130 may be implemented in platform 1020.

In some implementations, as shown, platform 1020 may be hosted in cloud computing environment 1022. Notably, while implementations described herein describe platform 1020 as being hosted in cloud computing environment 1022, in some implementations, platform 1020 may not be cloud-based (i.e., may be implemented outside of a cloud computing environment) or may be partially cloud-based.

Cloud computing environment 1022 includes an environment that hosts platform 1020. Cloud computing environment 1022 may provide computation, software, data access, storage, etc. services that do not require end-user (e.g., user device 1010) knowledge of a physical location and configuration of system(s) and/or device(s) that hosts platform 1020. As shown, cloud computing environment 1022 may include a group of computing resources 1024 (referred to collectively as "computing resources 1024" and individually as "computing resource 1024").

Computing resource 1024 includes one or more personal computers, a cluster of computing devices, workstation computers, server devices, or other types of computation and/or communication devices. In some implementations, computing resource 1024 may host platform 1020. The cloud resources may include compute instances executing in computing resource 1024, storage devices provided in computing resource 1024, data transfer devices provided by computing resource 1024, etc. In some implementations, computing resource 1024 may communicate with other computing resources 1024 via wired connections, wireless connections, or a combination of wired and wireless connections.

As further shown in FIG. 10, computing resource 1024 includes a group of cloud resources, such as one or more applications ("APPs") 1024-1, one or more virtual machines ("VMs") 1024-2, virtualized storage ("VSs") 1024-3, one or more hypervisors ("HYPs") 1024-4, or the like.

Application 1024-1 includes one or more software applications that may be provided to or accessed by user device 1010. Application 1024-1 may eliminate a need to install and execute the software applications on user device 1010. For example, application 1024-1 may include software associated with platform 1020 and/or any other software capable of being provided via cloud computing environment 1022. In some implementations, one application 1024-1 may send/receive information to/from one or more other applications 1024-1, via virtual machine 1024-2.

Virtual machine 1024-2 includes a software implementation of a machine (e.g., a computer) that executes programs like a physical machine. Virtual machine 1024-2 may be either a system virtual machine or a process virtual machine, depending upon use and degree of correspondence to any real machine by virtual machine 1024-2. A system virtual machine may provide a complete system platform that supports execution of a complete operating system ("OS"). A process virtual machine may execute a single program, and may support a single process. In some implementations, virtual machine 1024-2 may execute on behalf of a user (e.g., user device 1010), and may manage infrastructure of cloud computing environment 1022, such as data management, synchronization, or long-duration data transfers.

Virtualized storage 1024-3 includes one or more storage systems and/or one or more devices that use virtualization techniques within the storage systems or devices of computing resource 1024. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1024-4 may provide hardware virtualization techniques that allow multiple operating systems (e.g., "guest operating systems") to execute concurrently on a host computer, such as computing resource 1024. Hypervisor 1024-4 may present a virtual operating platform to the guest operating systems, and may manage the execution of the guest operating systems. Multiple instances of a variety of operating systems may share virtualized hardware resources.

Network 1030 includes one or more wired and/or wireless networks. For example, network 1030 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 10 are provided as an example. In practice, there may be additional devices and/or networks, fewer devices and/or networks, different devices and/or networks, or differently arranged devices and/or networks than those shown in FIG. 10. Furthermore, two or more devices shown in FIG. 10 may be implemented within a single device, or a single device shown in FIG. 10 may be implemented as multiple, distributed devices. Additionally, or alternatively, a set of devices (e.g., one or more devices) of environment 1000 may perform one or more functions described as being performed by another set of devices of environment 1000.

Figure 11:
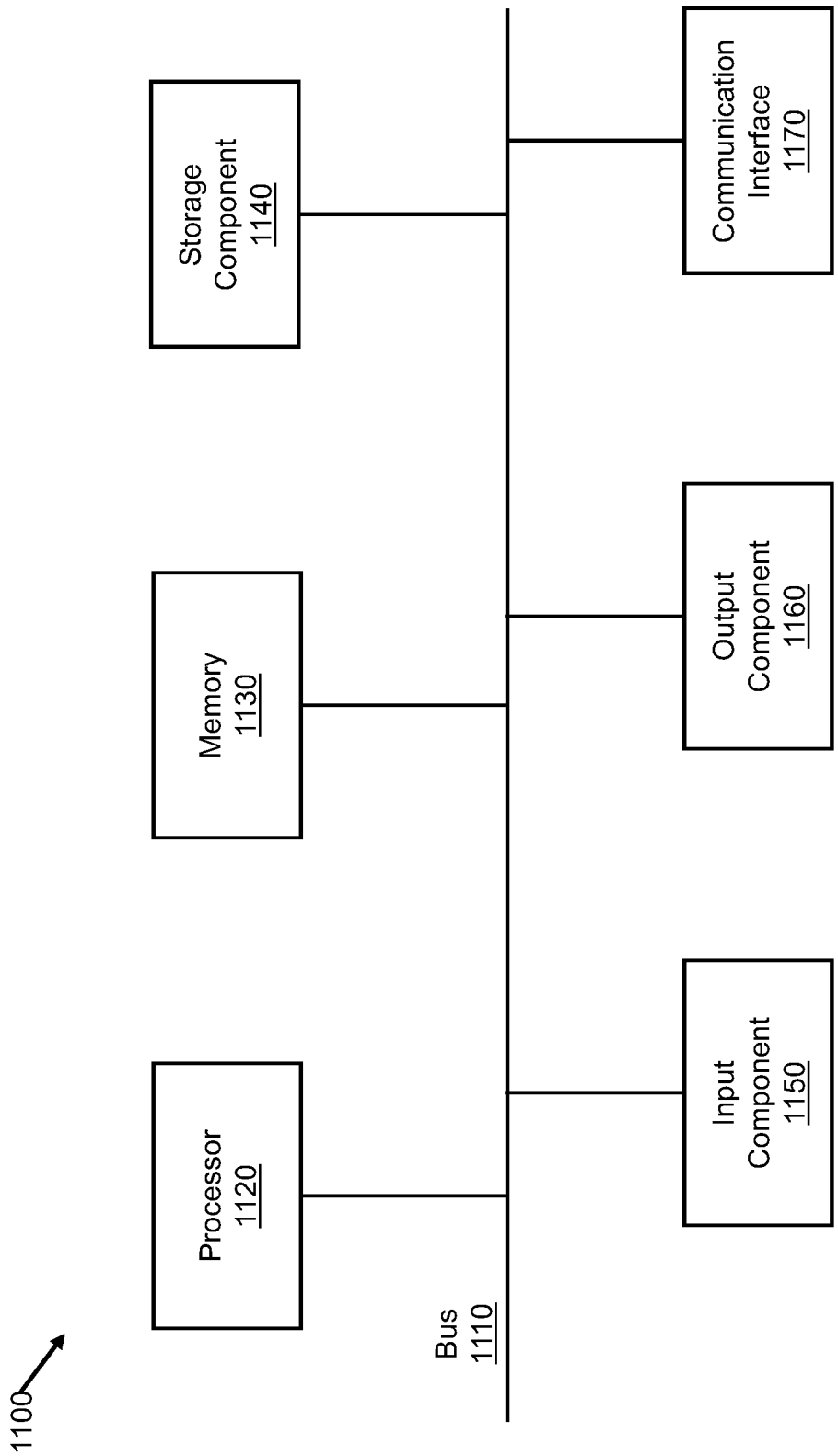
FIG. 11 is a diagram of example components of a device, according to one or more embodiments.

FIG. 11 is a diagram of example components of a device 1100. Device 1100 may correspond to user device 1010 and/or platform 1020. As shown in FIG. 11, device 1100 may include a bus 1110, a processor 1120, a memory 1130, a storage component 1140, an input component 1150, an output component 1160, and a communication interface 1170.

Bus 1110 includes a component that permits communication among the components of device 1100. Processor 1120 may be implemented in hardware, firmware, or a combination of hardware and software. Processor 1120 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1120 includes one or more processors capable of being programmed to perform a function. Memory 1130 includes a random access memory (RAM), a read only memory (ROM), and/or another type of dynamic or static storage device (e.g., a flash memory, a magnetic memory, and/or an optical memory) that stores information and/or instructions for use by processor 1120.

Storage component 1140 stores information and/or software related to the operation and use of device 1100. For example, storage component 1140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1150 includes a component that permits device 1100 to receive information, such as via user input (e.g., a touch screen display, a keyboard, a keypad, a mouse, a button, a switch, and/or a microphone). Additionally, or alternatively, input component 1150 may include a sensor for sensing information (e.g., a global positioning system (GPS) component, an accelerometer, a gyroscope, and/or an actuator). Output component 1160 includes a component that provides output information from device 1100 (e.g., a display, a speaker, and/or one or more light-emitting diodes (LEDs)).

Communication interface 1170 includes a transceiver-like component (e.g., a transceiver and/or a separate receiver and transmitter) that enables device 1100 to communicate with other devices, such as via a wired connection, a wireless connection, or a combination of wired and wireless connections. Communication interface 1170 may permit device 1100 to receive information from another device and/or provide information to another device. For example, communication interface 1170 may include an Ethernet interface, an optical interface, a coaxial interface, an infrared interface, a radio frequency (RF) interface, a universal serial bus (USB) interface, a Wi-Fi interface, a cellular network interface, or the like.

Device 1100 may perform one or more processes described herein. Device 1100 may perform these processes in response to processor 1120 executing software instructions stored by a non-transitory computer-readable medium, such as memory 1130 and/or storage component 1140. A computer-readable medium is defined herein as a non-transitory memory device. A memory device includes memory space within a single physical storage device or memory space spread across multiple physical storage devices.

Software instructions may be read into memory 1130 and/or storage component 1140 from another computer-readable medium or from another device via communication interface 1170. When executed, software instructions stored in memory 1130 and/or storage component 1140 may cause processor 1120 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 11 are provided as an example. In practice, device 1100 may include additional components, fewer components, different components, or differently arranged components than those shown in FIG. 11. Additionally, or alternatively, a set of components (e.g., one or more components) of device 1100 may perform one or more functions described as being performed by another set of components of device 1100.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system comprising:
a network node comprising:
a memory storing instructions; and
at least one processor configured to execute the instructions to:
determine one or more optimal uplink (UL) data paths for a user equipment (UE) by determining a UL path quality and selecting the one or more optimal UL data paths based on the determined UL path quality; and
provide information associated with the optimal UL path to the UE,
wherein the at least one processor is configured to executed the instructions to determine the one or more optimal UL data paths by:
obtaining a first value defining a UL path quality by:
determining whether or not at least one parameter associated with UL performance fulfills a condition defined by a parameter threshold associated with the at least one parameter;
determining whether or not a timer value fulfills a condition defined by a timer threshold;
based on determining that the at least one parameter does not fulfill the condition defined by the parameter threshold and based on determining that the timer value fulfills the condition defined by the timer threshold, assigning, to the first value, a value defining that the UL path quality is good; or
based on determining that the at least one parameter fulfills the condition defined by the parameter threshold and based on determining that the timer value fulfills the condition defined by the timer threshold, assigning, to the first value, a value defining that the UL path quality is poor; and
determining that the UL path quality is good or poor based on the obtained first value.

2. The system as claimed in claim 1, wherein the at least one processor is configured to execute the instructions to determine the one or more optimal UL data paths by:
determining a Long Term Evolution (LTE) UL path quality;
determining a New Radio (NR) UL path quality; and
selecting the one or more optimal UL data paths based on the determined LTE UL path quality and the determined NR UL path quality.

3. The system as claimed in claim 2, wherein the first value defines the LTE UL path quality, and
wherein the at least one processor is configured to execute the instructions to determine the UL path quality by:
obtaining the first value defining the LTE UL path quality and a first threshold value;
comparing the first value to the first threshold value;
based on determining that the first value is equal to or greater than the first threshold value, determining that LTE UL path quality is good; and
based on determining that the first value is lower than the first threshold value, determining that the LTE UL path quality is poor.

4. The system as claimed in claim 2, wherein the first value defines the NR UL path quality, and
wherein the at least one processor is configured to execute the instructions to determine the UL path quality by:
obtaining the first value defining the NR UL path quality and a second threshold value;
comparing the first value to the second threshold value;
based on determining that the first value is equal to or greater than the second threshold value, determine that NR UL path quality is good; and
based on determining that the first value is lower than the second threshold value, determine that the NR UL path quality is poor.

5. The system as claimed in claim 2, wherein the at least one processor is configured to execute the instructions to select the one or more optimal UL data paths by:
determining a combination of the LTE UL path quality and the NR UL path quality;
based on determining that the combination defines that the LTE UL path quality is poor and the NR UL path quality is poor, selecting one or more default primary UL path as the one or more optimal UL paths;
based on determining that the combination defines that the LTE UL path quality is poor and the NR UL path quality is good, selecting the NR UL path as the one or more optimal UL paths;
based on determining that the combination defines that the LTE UL path quality is good and the NR UL path quality is poor, selecting the LTE UL path as the one or more optimal UL paths; and
based on determining that the combination defines that the LTE UL path quality is good and the NR UL path quality is good, selecting the LTE UL path quality and the NR UL path as the one or more optimal UL paths.

6. The system as claimed in claim 5, wherein the at least one processor is configured to execute the instructions to:
based on determining that only one of the LTE UL path and the NR UL path is selected as the one or more optimal UL paths, configure a value defining a UL data split threshold to infinity.

7. A method, performed by at least one processor, comprising:
determining one or more optimal uplink (UL) data paths for a user equipment (UE) by determining a UL path quality and selecting the one or more optimal UL data paths based on the determined UL path quality; and
providing information associated with the optimal UL path to the UE,
wherein the determining the one or more optimal UL data paths by:
obtaining a first value defining a UL path quality by:
determining whether or not at least one parameter associated with UL performance fulfills a condition defined by a parameter threshold associated with the at least one parameter;

determining whether or not a timer value fulfills a condition defined by a timer threshold;

based on determining that the at least one parameter does not fulfill the condition defined by the parameter threshold and based on determining that the timer value fulfills the condition defined by the timer threshold, assigning, to the first value, a value defining that the UL path quality is good; or based on determining that the at least one parameter fulfills the condition defined by the parameter threshold and based on determining that the timer value fulfills the condition defined by the timer threshold, assigning, to the first value, a value defining that the UL path quality is poor; and determining that the UL path quality is good or poor based on the obtained first value.

8. The method as claimed in claim 7, wherein the determining of the one or more optimal UL data paths comprises:
determining a Long Term Evolution (LTE) UL path quality;
determining a New Radio (NR) UL path quality; and
selecting the one or more optimal UL data paths based on the determined LTE UL path quality and the determined NR UL path quality.

9. The method as claimed in claim 8, wherein the first value defines the LTE UL path quality, and
wherein the determining of the UL path quality comprises:
obtaining the first value defining the LTE UL path quality and a first threshold value;
comparing the first value to the first threshold value;
based on determining that the first value is equal to or greater than the first threshold value, determining that LTE UL path quality is good; and
based on determining that the first value is lower than the first threshold value, determining that the LTE UL path quality is poor.

10. The method as claimed in claim 8, wherein the first value defines the NR UL path quality,
wherein the determining of the UL path quality comprises:
obtaining the first value defining the NR UL path quality and a second threshold value;
comparing the first value to the second threshold value;
based on determining that the first value is equal to or greater than the second threshold value, determine that NR UL path quality is good; and
based on determining that the first value is lower than the second threshold value, determine that the NR UL path quality is poor.

11. The method as claimed in claim 8, wherein the selecting of the one or more optimal UL data paths comprises:
determining a combination of the LTE UL path quality and the NR UL path quality;
based on determining that the combination defines that the LTE UL path quality is poor and the NR UL path quality is poor, selecting one or more default primary UL path as the one or more optimal UL paths;
based on determining that the combination defines that the LTE UL path quality is poor and the NR UL path quality is good, selecting the NR UL path as the one or more optimal UL paths;
based on determining that the combination defines that the LTE UL path quality is good and the NR UL path quality is poor, selecting the LTE UL path as the one or more optimal UL paths; and
based on determining that the combination defines that the LTE UL path quality is good and the NR UL path quality is good, selecting the LTE UL path quality and the NR UL path as the one or more optimal UL paths.

12. The method as claimed in claim 11, further comprising:
based on determining that only one of the LTE UL path and the NR UL path is selected as the one or more optimal UL paths, configuring a value defining a UL data split threshold to infinity.

13. A non-transitory computer-readable recording medium having recorded thereon instructions executable by at least one processor to cause the at least one processor to perform a method comprising:
determining one or more optimal uplink (UL) data paths for a user equipment (UE) by determining a UL path quality and selecting the one or more optimal UL data paths based on the determined UL path quality; and
providing information associated with the optimal UL path to the UE,
wherein the determining the one or more optimal UL data paths by:
obtaining a first value defining a UL path quality by:
determining whether or not at least one parameter associated with UL performance fulfills a condition defined by a parameter threshold associated with the at least one parameter;
determining whether or not a timer value fulfills a condition defined by a timer threshold;
based on determining that the at least one parameter does not fulfill the condition defined by the parameter threshold and based on determining that the timer value fulfills the condition defined by the timer threshold, assigning, to the first value, a value defining that the UL path quality is good; or
based on determining that the at least one parameter fulfills the condition defined by the parameter threshold and based on determining that the timer value fulfills the condition defined by the timer threshold, assigning, to the first value, a value defining that the UL path quality is poor; and
determining that the UL path quality is good or poor based on the obtained first value.

14. The non-transitory computer-readable recording medium as claimed in claim 13, wherein the determining of the one or more optimal UL data paths comprises:
determining a Long Term Evolution (LTE) UL path quality;
determining a New Radio (NR) UL path quality; and
selecting the one or more optimal UL data paths based on the determined LTE UL path quality and the determined NR UL path quality.

15. The non-transitory computer-readable recording medium as claimed in claim 14, wherein the first value defines the LTE UL path quality, and
wherein the determining of the UL path quality comprises:
obtaining the first value defining the LTE UL path quality and a first threshold value;
comparing the first value to the first threshold value;
based on determining that the first value is equal to or greater than the first threshold value, determining that LTE UL path quality is good; and based on determining that the first value is lower than the first threshold value, determining that the LTE UL path quality is poor.

16. The non-transitory computer-readable recording medium as claimed in claim 14, wherein the first value defines the NR UL path quality,
wherein the determining of the UL path quality comprises:
obtaining the first value defining the NR UL path quality and a second threshold value;
comparing the first value to the second threshold value;
based on determining that the first value is equal to or greater than the second threshold value, determine that NR UL path quality is good; and
based on determining that the first value is lower than the second threshold value, determine that the NR UL path quality is poor.

* * * * *